Feb. 22, 1944. L. S. HARBER 2,342,270
MANUFACTURE OF BREAD
Filed Aug. 20, 1941
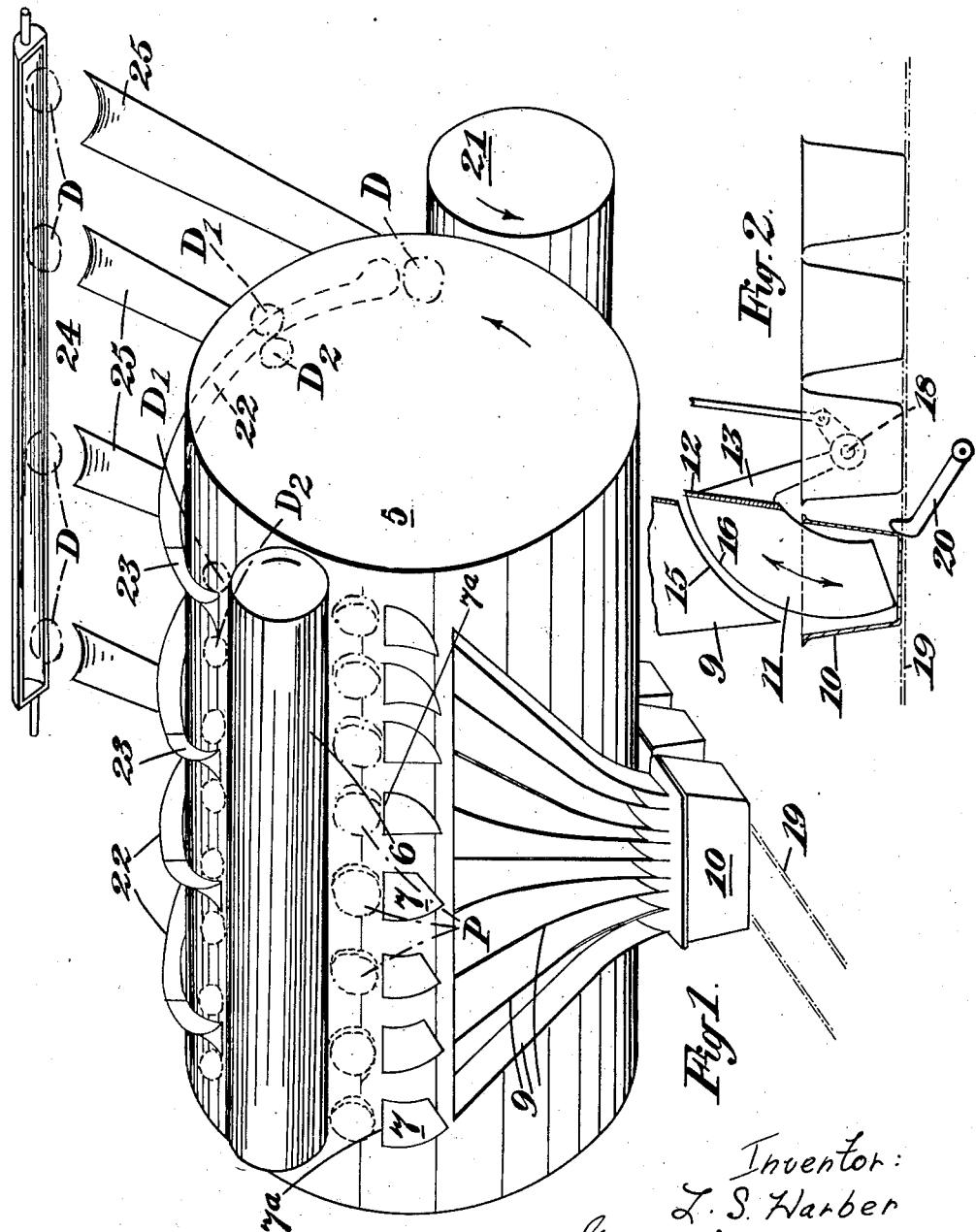
Inventor:
L. S. Harber
By: Glascock Downing & Seebold
Attys.

Patented Feb. 22, 1944

2,342,270

UNITED STATES PATENT OFFICE 2,342,270

MANUFACTURE OF BREAD

Laurence Seymour Harber, Peterborough, England, assignor to Baker Perkins Limited, Peterborough, England Application August 20, 1941, Serial No. 407,660
In Great Britain May 8, 1940

4 Claims. (Cl. 107—4)

This invention relates to the manufacture of tin bread having a laminated structure and more particularly laminated bread according to prior patent specification No. 2,045,228. In patent specification Serial No. 726,102, filed May 17, 1934, which has become Patent No. 2,008,036, patented July 16, 1935, there is described a plant for the mechanical manufacture of laminated bread as aforesaid in which a group of flattened dough pieces are fed in succession along a common path into the baking tin.

As compared with the plant described in the last-mentioned specification, an aim of the present invention is to provide means adapted to afford an increased output and more uniform product.

According to the invention, in the production of laminated bread a group of flattened dough pieces or plaques are fed in parallel (i. e. along individual paths) to a baking tin so that they form a laminated body on edge in the baking tin with laminae substantially at right-angles to the axis of the tin.

The flattened dough pieces may travel along converging paths whereby they are delivered into the tin in close order. The group of flattened dough pieces may be assembled side by side in the tin but separated by displaceable guiding plates which, when all the pieces are in position, are withdrawn leaving the dough piece contiguous.

It is preferred to flatten the group of dough pieces simultaneously and immediately feed them together into the baking tin as indicated in the preceding paragraph.

Another feature of the invention lies in the division of a group of (for example four) small dough pieces in a multi-pocket divider simultaneously and after handing up and subjecting such to proof, in subdividing each piece of the group into two, whilst the group is travelling abreast, so that the full complement of dough pieces is ready for flattening and feeding into the tins together as above indicated.

For the purpose of enabling a group of proved dough pieces to be subdivided together as specified in the preceding paragraph, a prover arrangement may be provided whereby the dough pieces are delivered to a prover in predetermined groups (for example four in this case) and discharged from the prover simultaneously to means adapted to feed them abreast to the subdividing means.

In the accompanying diagrammatic drawing:

Figure 1 is a perspective view of a plant according to the invention,

Figure 2 is an elevation showing the arrangement of the separator partition means.

In carrying the invention into effect, as described by way of example, a rotary drum 5 of substantial diameter is provided and mounted in suitable bearings in side frames. Adjacent the position where the surface of the drum begins to travel downwardly a flattening roller 6 is mounted with its axis parallel with that of the drum and adapted to co-operate with the drum surface to flatten dough pieces fed forward upon or above the surface of the drum.

Instead of employing a single roller 6 a pair of rollers or a plurality of rollers may be employed for flattening, in reference to which the dough pieces are subjected to a successive flattening operation in passing under each roller.

On the delivery side of the flattening roller 6 (or rollers) is a series of guide plates 7 which are adapted to turn the flattened dough pieces or plaques P received from the flattening roller through an angle of approximately 20°. Where it is intended that eight dough pieces should be used to compose a loaf, eight guides are provided. The outer guides may also be curved to direct the dough pieces inwardly towards the central transverse plane of the drum. The guides 7 are mounted in a frame suitably supported from the side frames of the machine, and each guide comprises a plate which is skewed so that a part or edge 7a engages under a flattening dough piece and detaches it from the drum surface and as the dough piece or plaque P falls by gravity the twist in the plate turns the dough piece round through approximately 90°. Below the guide plates is a series of nine partition walls 9 forming eight chutes in parallel, corresponding in number with the number of dough pieces in the groups to be received. These chute partition walls converge so that their lower extremities may lie approximately within the area of the opening of a baking tin 10 to bring the flattened dough pieces face to face and separated only by the thickness of the partitions. It is preferred that at the lower edge of each partition plate a displaceable extension piece or plate is provided which is adapted to extend into a baking tin to be filled approximately to the bottom thereof, with a view to maintaining control of the dough pieces until all are settled on edge side by side in position within the tin.

The extension pieces 11 may comprise a series of plates which in side elevation are of arcuate form. The upper ends of these plates are mounted upon a cross-bar or member 12 carried by a pair of arms 13 having trunnions 18 mounted in bearings so that the plates may be given a partial rotation to and fro about the trunnion axis. Lever, linkage or other means 14 are provided for imparting an oscillation to the device from a cam or crank movement in order to lower the plates so that they dip into a tin about to be filled and subsequently to be raised out of the tin and clear of the top thereof when the tin is about to be moved away from the charging position and another tin introduced into the charging position.

In order that the surface of the partitions and the displaceable extension plates should be practically continuous the lower edge of each partition 9 terminates in an arc 15 corresponding with that of the upper or outer edge 16 of its extension plate 11 and is spaced therefrom sufficiently to provide a working clearance.

According to another form of chute member and extension piece the fixed chute elements may terminate above the opening of the baking tin, in which case the guiding of the dough pieces in the latter part of their converging path is taken care of by flared displaceable guides. In some cases it may be preferred to turn the flattened dough pieces through the required angle partly by the aid of the guides and partly in the chutes, in which case the chute members at their upper ends are slightly skewed.

The tins 10 are supported upon a conveyor which may comprise rails or rollers or chains 19, and the tins are fed under the charging station in a procession in close order. Pawl devices 20 may be provided to enter between the bottom of the tins to arrest the passage of the tins while the foremost is being filled at the charging station, after which the pawl device operates to release the filled tin so that it may be moved forward by the conveyor, and stop the next tin under the charging station.

Alternatively, any suitable means may be provided for feeding each tin 10 under the charging station in succession, halting each tin in turn in the charging position for an appropriate time for the filling operation, and then passing it on for delivery to the final proving and oven and replacement by another tin. The travel of the tins 10 or their movement into and out of the charging station is synchronised with the delivery of dough pieces to the drum either mechanically or by timing the conveyor operations. It will be appreciated that whilst the intention is to deliver the group of dough pieces into a tin simultaneously, owing to fortuitous circumstances the dough pieces or plaques P may not always arrive exactly together as some may take longer than others in travelling down the chutes or partitions 9 or slight delays may have occurred earlier in the treatment.

According to one mode of feeding dough pieces to the flattening roller (or rollers) 6, the rising side of the drum 5 may be utilised for the subdivision of dough pieces (four in the present instance) which are fed to the drum. Below the horizontal diametric plane on the rising side of the drum 5, a rotary feeding roller 21 is mounted with its axis parallel to that of the drum so that any dough pieces delivered on to this feeding roller are pressed against the drum surface which picks them up and carries them upwardly under subdividing means. These subdividing means are according to prior patent specification Serial No. 365,904 and comprise a series of blunt elongated dividing plates or necking members 22, the undersurface of each of which is spaced from the drum 5 at a position above the feeding roller 21 at an interval sufficient to admit the entry of a registered dough piece D which has been seized by the drum 5 or nipped between the drum and the end of the necking or dividing member 22. The space between the dividing device or member and the drum surface progressively decreases in the direction of travel, and at the top of the drum or just where the surface is directed downwardly the dividing device is so close to the roller that the dough passing thereunder is formed with a twisted neck and severed to form two balls of dough $D_1 D_2$.

At the upper end each dividing device 22 terminates in a triangular member 23 adapted to separate the divided pieces and turn each severance neck formed thereon below its dough piece, the arrangement being such that the separation and spacing of the subdivided pieces $D_1 D_2$ enable them to be flattened to a plaque-like form P under the flattening roller 6 (or rollers) without touching one another. Any suitable means may be provided for driving the drum, the flattening roller and the feeding roller, at an appropriate rate.

The feeding roller 21 is supplied with groups of four dough pieces abreast from the prover tray 24 by chutes 25 or conveyor bands so that they arrive practically simultaneously and in register with the lower ends of the dividing device 22 to enable the latter to act symmetrically thereon.

According to a modification, instead of subdividing the dough pieces upon the drum between the necking-dividing means and the drum surface they may be divided upon a flat apron surface as described in patent specification Serial No. 365,904, the apron being mounted to travel forwardly over a knife edge positioned over and adjacent to the top of the drum so that the eight (or other number) pieces are presented immediately to the flattening roller.

According to another modification, instead of employing a rotary drum for subdivision and subsequent flattening and tin-charging the subdivision may take place upon a flat apron conveyor surface between such surface and necking-dividing means. A downwardly inclined extension is provided for the conveyor band having a series of guide plates and chute partitions mounted above it for delivering the dough pieces into the baking tins, similar to those described in connection with the drum. In this case a flattening roller may co-operate with the subdividing surface of the conveyor or with the upper part of the inclined extension. It will be appreciated that it is not essential to employ the subdivision of a group of four pieces (or other predetermined number of pieces) as the dividing operation may be carried out by necking-dividing means operating initially upon 2 lb. or pieces of other predetermined weight of dough, which is first divided into two, the two pieces then divided into four, and the group of four then finally divided into eight where it is desired to employ eight flattened pieces for feeding on edge together into the tins.

According to another alternative the full complement of dough pieces (eight in the case under consideration) may be fed into a prover with eight pockets or having elongated trays to accommodate eight pieces. The prover delivers the eight pieces abreast and these are simultaneously flattened and fed to the baking tins after the manner above described. The division into groups of eight pieces may be effected in an eight pocket divider producing 4½ oz. pieces, or the division may be effected by the use of necking-dividing means of the character indicated above.

I claim:

1. Apparatus for flattening a series of dough pieces approximately simultaneously and feeding them in parallel into a baking tin, comprising a conveying surface for the dough pieces, a flattening roller cooperating with said surface to flatten the dough pieces, guide means for receiving the flattened dough pieces and turning them through an angle into a series of converging chutes which deliver the flattened dough pieces in parallel and in close order into the baking tin where they form a laminated body on edge in the tin with laminae substantially at right angles to the axis of the tin.

2. Apparatus for flattening a series of dough pieces approximately simultaneously and feeding them in parallel into a baking tin where they form a laminated body on edge with laminae substantially at right angles to the axis of the tin, comprising a drum forming a conveying surface for the dough pieces, a flattening roller cooperating with said drum to flatten the dough pieces, a series of necking-dividing means cooperating with said drum to subdivide a parallel series of dough pieces conveyed by said drum, said means terminating in dough piece spacing devices whereby the subdivided dough pieces are spaced and delivered to the flattening roller, guide means for receiving the flattened dough pieces and turning them through an angle into a series of converging chutes which deliver the flattened dough pieces in parallel and in close order into the baking tin.

3. Apparatus as claimed in claim 2, wherein the chutes are formed by partitions which terminate above the baking tin, said partitions being provided with arcuate extension pieces mounted for movement into the tin, during the feeding of the flattened dough pieces therein.

4. Apparatus as claimed in claim 2, wherein a feeding roll co-operates with the drum to receive a group of dough pieces abreast from a prover tray and deliver them simultaneously to the necking-dividing means.

LAURENCE SEYMOUR HARBER.